June 23, 1959    W. S. BAKER    2,891,831
PISTON RING EXPANDER RING
Filed Jan. 9, 1958

INVENTOR
Weldon S. Baker

BY

ATTORNEY

United States Patent Office

2,891,831
Patented June 23, 1959

2,891,831

PISTON RING EXPANDER RING

Weldon S. Baker, Fort Worth, Tex.

Application January 9, 1958, Serial No. 708,024

6 Claims. (Cl. 309—40)

This invention relates to piston rings and more particularly to expanders for piston rings.

In many cases, it is desirable that piston rings be provided with expanders to urge the rings outwardly into sealing contact with the wall of the cylinder in which the ring is used.

It is, therefore, one object of this invention to provide a piston ring and an expander therefor for expanding the piston ring into sealing contact with the wall of the cylinder in which the piston ring moves.

Another object is to provide, for a piston ring, an expander of the character described wherein the expander exerts a uniform expansive force on the inside surface of the ring.

A further object is to provide an expander of the character described wherein the expander is formed of a sinuous strip of resilient material such as spring steel or other suitable metal, the expander circumferentially engaging the inner surface of the piston ring and thereby exerting a circumferential expansive force on the ring.

An important object is to provide an expander of the character described wherein the ends of the ring are provided with means for securing the ends together so that the ends do not slip past each other and so that the piston ring and the expander may be readily compressed into a corresponding groove in the piston for insertion of the piston into the cylinder.

Another object is to provide a connecting means for the ends of the expander, which may be readily connected or disconnected.

An additional object is to provide a retaining means for the ends of the expander wherein the ends of the expander are so interengaged as to prevent damage to the groove in which the expander is positioned.

Additional objects and advantages of the invention will be readily apparent from the reading of the following description of devices constructed in accordance with the invention, and reference to the accompanying drawings thereof, wherein.

Figure 2:
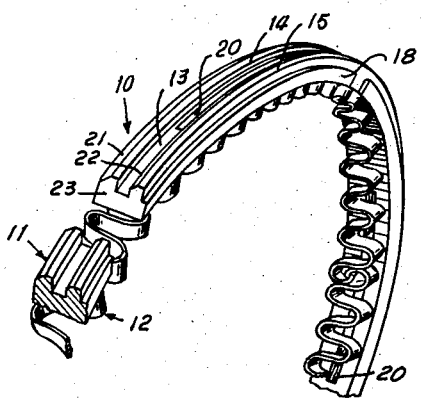
Figure 2 is an enlarged perspective view of a portion of the piston ring and an expander of Figure 1.
Figure 3:
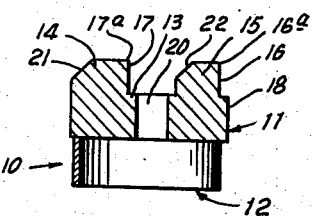
Figure 3 is an enlarged sectional view taken along the line 3—3 of Figure 1.

Referring now to the drawings, the composite two-piece expandable piston ring assembly 10 is composed of a cylinder-contacting piston ring 11 and an expander 12 disposed inside the ring 11.

Figure 4:
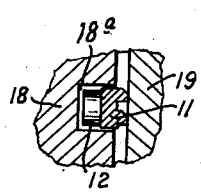
Figure 4 is a fragmentary sectional view showing the piston ring and expander positioned on a piston in a cylinder.
Figure 1:
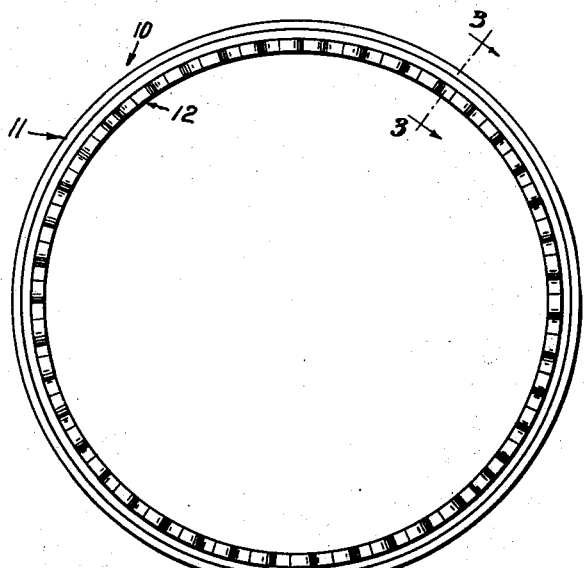
Figure 1 is a plan view of a piston ring with an expander positioned therein.

The ring 11 may be any usual type of ring, but is shown as being an oil ring provided with an inwardly extending annular circumferential groove 13 in its outer surface, the groove being spaced approximately equidistant from the upper and lower faces of the ring to provide upper and lower radially projecting annular flanges 14 and 15, respectively. The lower face of the lower flange 15 is relieved at 16 and is formed approximately perpendicular to the axis of the ring, the lower face 17 of the upper flange 14 being similarly approximately perpendicular to the axis of the ring. The lower faces of the flanges thus form scraper or wiper surfaces 16a and 17a, respectively, for engaging the walls of the cylinder 19 (Fig. 4) whereby, as the piston ring is moved downwardly in the cylinder, the surfaces scrape excess oil from the wall of the cylinder. The piston ring is provided with the usual radial apertures 20 between the flanges so that the oil scraped off the cylinder wall by the upper flange may pass downwardly therethrough to the lower part of the engine and to the crankcase. The upper faces 21 and 22 of the flanges 14 and 15 are downwardly and outwardly beveled in the usual manner.

The ring 11 is split circumferentially at 23 so the ring may expand or contract as necessary to be positioned in the ring groove 18a of the piston 18 and to contact the walls of the cylinder 19.

The expander 12 is formed of a flat strip of material such as spring steel or other metal and is bent back and forth upon itself in a sinuous manner to form a corrugated expander strip 24. The expander strip is then formed into a circular arc to be positioned in the ring groove of the piston inside the cylinder-contacting ring 11, the plane of the circular arc being perpendicular to the corrugations of the strip. The length of the expander strip is greater than the inner circumference of the piston ring 11 so that the expander strip is compressed or deformed circumferentially inwardly when the strip is positioned within the piston ring, and the expander thus exerts an expansive force on the ring.

Figure 5:
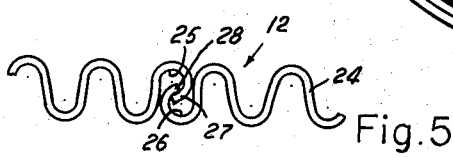
Figure 5 is an enlarged detailed view showing the method of joining the ends of the expander as shown in Figure 2.

Referring now to Figures 2 and 5, the two ends of the expander strip are formed into slightly open circular loops or hooks 25 and 26, the loop 25 opening downwardly and the loop 26 opening upwardly, as shown in Figure 5. The free end 27 of the loop 25 extends downwardly and is engageable in the open portion of the loop 26, while the free end 28 of the loop 26 extends upwardly and is engageable in the open portion of the loop 25. The loops 25 and 26 are closed sufficiently and the free ends bent sufficiently toward completion of circles that the free ends 27 and 28 may be inserted into or removed from the open portions of the loops 26 and 25, respectively, only by moving one loop laterally into the other to hook the ends together. The ends of the corrugated expander strip are thus disposed in interlocking engagement whereby they are positively retained connected to one another.

The expander strip may thus be positioned inside the cylinder-contacting piston ring 11 and be deformed inwardly therewith into a ring groove 18a in a piston 18. The positioning of the expander strip inside the ring 11 and into the ring groove is facilitated, as the ends are held together by the loops 25 and 26 as set forth above. In addition, the ends of the expander strip are prevented from scraping or otherwise contacting the surfaces of the ring groove, thus obviating any damage to the groove from such causes. It is further impossible for the ends of the expander strip to slip past one another out of connected engagement because of the interlocking characteristics of the loops 25 and 26, so the circumferential dimension of the strip is controlled and the force exerted by the strip on the piston ring likewise controlled.

Figure 6:
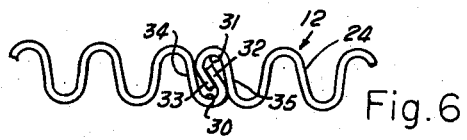
Figures 6 and 7 are views similar to Figure 5, showing modified methods of joining the ends of a piston ring expander.

In Figure 6 is shown a slightly modified form of end connection for the corrugated expander strip 24, wherein the ends of the strip are formed into substantially U-shaped portions 30 and 31 opening upwardly and downwardly, respectively. The free legs 32 and 33, respectively, of the U-shaped portions 30 and 31 are bent back toward the other legs 34 and 35 whereby the opening between the legs is restricted. The free legs are insertable into the open U-shaped portions only by moving one end laterally inwardly or outwardly relative to the other in the same manner as were the circular loops of the device of Figure 5, the angular position and engagement of the arms 32 and 33 preventing longitudinal movement out of or into such hooked or interlocked connection.

The U-shaped end connection of Figure 6 has all the advantages of the connection of Figure 5 with the additional advantage that the U-shaped bends may be more easily and economically made.

Figure 7:
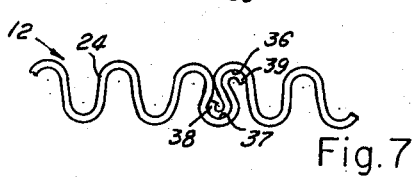

In Figure 7, a further modified form of end connection is shown wherein the ends of the corrugated strip are formed into open circular loops 36 and 37 in a manner similar to the loops 25 and 26 of Figure 5. However, the free ends of the loops are then bent back in reverse curves 38 and 39, respectively, to form the S-shaped lock member, each reversed curved portion fitting closely within the open loop of the lock member on other end of the corrugated strip.

The S-shaped end connections or lock members have all the advantages of the end connection shown in Figure 5.

It will be seen that a resilient piston ring expander strip has been disclosed which is provided with locking members at its ends for interlocking or connecting the ends of the strip to provide a continuous annular expander member which will exert a uniform circumferential expansive force on the piston ring with which it is used. It will also be seen that the inter-locked ends of the expander strip facilitate handling of the strip when inserting it and the piston ring into the ring groove of a piston, and with the piston into a cylinder; and that when the expander has been installed in place, it retains the desired circumferential dimension because of the interlocked ends preventing any changes in position of the ends with respect to each other. Likewise, it will be seen that the inter-locked ends of the expander prevent any gouging, scraping or scarring of the ring groove of the piston which might occur if the ends were free. Furthermore, the interlocked ends of the expander provide for close control of the circumferential dimension of the expander and thus for close control of the expansive force exerted on the piston ring. It is particularly important to note that all forms of the locking members have been formed of the material of the expander strip, so that there are no extra or separate parts to make or handle in connecting the ends of the expander.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A flexible expander for a piston ring, said expander including: an elongate resilient strip formed into a circle and being bent back and forth upon itself across the plane of the circle in a series of corrugations; said strip having ends with an open loop on each end, said loops being engageable with the tip end of each end of the strip extending through the loop opening at the opposite end of said strip and within such loop whereby said ends are held connected, said loops lying in the same plane as the corrugations.

2. A flexible expander for a piston ring, said expander including: an elongate resilient strip formed with a plurality of corrugations therein; and a hook on each end of said strip and in the same plane as the corrugations; said strip being formed into an open circle whose axis is parallel to the axis of amplitude of the corrugations of the strip; said hooks being engageable to releasably hold the ends of said strip connected together.

3. A flexible expander for a piston ring, said expander including: a resilient strip formed into a circle and having axial corrugations therein; an open circular loop formed on each end of the strip; the free end of each loop being bent back upon itself in a reverse curve, said reverse curve of each free end being removably insertable into the open circular loop of the other end of the strip to hold the ends connected together.

4. An expander for a piston ring of the character set forth in claim 3 wherein each circular loop is closed to such degree that the reverse curve of the other end of the strip is insertable and removable only on lateral movement of the ends relative to each other.

5. A flexible expander for a piston ring, said expander including: a resilient strip formed into a circle and having axial corrugations therein, means integral with the ends of the strip for releasably joining said ends, said means including an open loop on each end forming a continuation of the corrugations, the free end of each loop being engageable in the other loop; said loops being closed to such degree that the corresponding free ends are insertable only on lateral movement of the loops relative to each other.

6. A composite multi-piece piston ring comprising an annular ring member having a split therein, and an expander member therefor, said expander member including: a resilient strip formed into a circle and having axial corrugations therein; an open loop formed on each end of the strip as a continuation of the corrugations, the free end of each loop being engageable in the other loop to hold the ends of the strip connected together, said free ends being engageable in the loops only on lateral movement of said loops relative to one another; said expander member being positioned inside said ring member to radially expand said ring member.

References Cited in the file of this patent
UNITED STATES PATENTS
1,927,825   Elkin _____ Sept. 26, 1933